United States Patent [19]
Showalter et al.

[11] Patent Number: 5,234,658
[45] Date of Patent: Aug. 10, 1993

[54] SCARFING APPARATUS

[75] Inventors: Michael S. Showalter; John G. Dawson, Jr., both of Florence; Frank J. Gusky, Quinby, all of S.C.

[73] Assignee: ESAB Welding Products, Inc., Florence, S.C.

[21] Appl. No.: 805,111

[22] Filed: Dec. 9, 1991

[51] Int. Cl.⁵ .............................. B23K 7/06
[52] U.S. Cl. ........................ 266/51; 266/48
[58] Field of Search ................ 266/48, 51, 52, 74

[56] References Cited

U.S. PATENT DOCUMENTS

| | | | |
|---|---|---|---|
| 2,521,199 | 9/1950 | Babcock | 148/9 R |
| 3,230,116 | 1/1966 | Wandelt | 148/9 R |
| 3,477,646 | 11/1969 | Lytle | 266/51 |
| 4,115,154 | 9/1978 | Fuhrhop | 148/9.5 |
| 4,173,499 | 11/1979 | Hölemann | 148/9 R |
| 4,455,176 | 6/1984 | Fuhrhop | 148/9 R |
| 4,501,624 | 2/1985 | Lotz | 148/9 R |
| 4,765,597 | 8/1988 | Fuhrhop et al. | 266/51 |
| 4,954,683 | 9/1990 | Hatch | 219/121.5 |

FOREIGN PATENT DOCUMENTS

| | | |
|---|---|---|
| 1213203 | 6/1963 | Fed. Rep. of Germany . |
| 2404013 | 1/1974 | Fed. Rep. of Germany . |
| 2948777 | 6/1981 | Fed. Rep. of Germany . |
| 0274377 | 11/1990 | Japan . |

Primary Examiner—Scott Kastler
Attorney, Agent, or Firm—Bell, Seltzer, Park & Gibson

[57] ABSTRACT

A scarfing apparatus which allows a greater diagonal stand-off distance from a slab during preheating and scarfing is disclosed. The apparatus includes a manifold and head assembly for receiving and distributing oxygen and fuel gas. Upper and lower preheat blocks extend from the manifold and head assembly. The blocks are spaced to define an oxygen scarfing slot and discharge orifice of predetermined size for receiving a flow of scarfing oxygen from the manifold and head assembly. A plurality of preheat nozzle inserts are mounted within the upper preheat block adjacent to each other in a row substantially across the width of the upper preheat block. Each nozzle insert includes a central bore through which a flow of oxygen is received from the manifold and head assembly and discharged through the insert. Longitudinally extending, substantially parallel flutes are positioned on the outer surface of the nozzle inserts and form fuel gas flow channels which receive fuel gas from the manifold and head assembly and deliver the fuel gas in a substantially parallel, concentric flow around the central flow of oxygen to prevent a sharp fuel gas flow intersection with the oxygen to maintain the momentum of the oxygen adjacent the nozzles as it exits the central bore. The nozzle inserts may be readily replaced when damaged. A method of initiating preheating of a slab with the scarfing apparatus of the present invention also is disclosed.

9 Claims, 6 Drawing Sheets

SCARFING APPARATUS

FIELD OF THE INVENTION

This invention relates to a scarfing apparatus which allows a diagonal stand-off distance from a slab during preheating and scarfing initiation during four-sided end starting so that molten metal is not blown onto the scarfing apparatus, and a method of initiating scarfing on the end of a steel slab.

BACKGROUND OF THE INVENTION

Steel slabs commonly are conditioned by moving scarfing units along the top, bottom and side surfaces of a steel slab to eliminate surface defects such as cracks, seams and slag intrusions. One conventional scarfing apparatus includes top, side and bottom scarfing units that are mounted across the width and end portions of a support. The top, side and bottom units are arranged to scarf all sides of the slab.

Both top, side, and bottom units include a manifold and head assembly, which receives and distributes oxygen and fuel gas to upper and lower preheat blocks. The upper and lower preheat blocks are spaced from each other to define between the two blocks an oxygen scarfing slot through which a quantity of oxygen is blown onto the slab surface to enable scarfing. The lower preheat block includes a fuel gas channel having a discharge end positioned adjacent the oxygen slot for discharging a fuel gas adjacent the oxygen flow.

The upper preheat block typically is a one-piece unit that includes oxygen and fuel gas channels each having discharge orifices to define nozzles through which a combination of oxygen and fuel gas is discharged for preheating the slab before scarfing. Later, a postmix flow of oxygen and fuel gas provides for scarfing. To maintain a proper vertical stand-off distance of the nozzle exit from the steel slab, top and bottom scarfing units include riding shoes positioned on respective lower preheat blocks. Because the integrally formed nozzles do not provide for a high speed gas flow outward from the scarfing units, the total diagonal stand-off distance, i.e., the vertical stand-off distance and horizontal stand-off distance (the lead distance from the scarfing unit to the slab) is small, and the scarfing units must be placed in close proximity to the slab during preheating. Thus, in a conventional scarfing unit, the upper preheat block extends forward and hangs over the lower preheat block to direct the preheating stream of gas discharged from the upper preheat block onto the slab during preheating.

Because the upper preheat block extends forwardly beyond the lower preheat block, during initial preheating of the slab the molten steel formed on the slab edge may drip onto portions of the upper preheat block positioned below the slab. The molten steel may damage the upper preheat block requiring reconstruction or replacement of the preheat blocks. To avoid this problem, during initial preheating, the scarfing units are positioned adjacent the slab and heat the slab one to two inches inward of the end to prevent steel and slag from dripping onto the forwardly extending preheat block. As a result of starting the scarfing process inward from the end of the steel slab, the one or two inches of unscarfed steel must be either scrapped or hand scarfed, leading to excessive production costs.

Additionally, through continued use, the discharge ends forming the upper preheat nozzles may wear. Because the preheat nozzles are integrally formed in the upper preheat block, any damage to the nozzle area mandates either replacement of the entire upper preheat block, or removal of the damaged area and the brazing of new material onto the upper preheat block.

SUMMARY OF THE INVENTION

It is therefore an object of the present invention to provide a scarfing apparatus that is constructed to allow a greater diagonal stand-off distance from a slab during preheating and scarfing to permit initial scarfing at the front portion of the slab during four sided end starting so that molten metal is not blown onto the scarfing apparatus.

It is another object of the present invention to provide a scarfing apparatus that is constructed to facilitate economical repair and replacement of the preheat nozzle area positioned on the upper preheat block.

It is still another object of the present invention to provide a method of initiating end scarfing on the end of a steel slab and in which the scarfing apparatus is positioned a diagonal standoff distance sufficient to allow full width preheating of the end of the slab without having molten steel and other particles fall or be blown onto the scarfing apparatus.

In accordance with the present invention, the scarfing apparatus allows a greater diagonal stand-off distance from a slab during preheating and scarfing and permits ready replacement of the preheat nozzle area without replacing or reconstructing the entire upper preheat block. The apparatus includes a manifold and head assembly for receiving and distributing oxygen and fuel gas to upper and lower preheat blocks which are connected at one end of the manifold and head assembly and extend outward therefrom. The upper and lower preheat blocks are spaced from each other a predetermined distance to define an oxygen scarfing slot and a discharge orifice of predetermined size for receiving a flow of scarfing oxygen from the manifold and head assembly and discharging the scarfing oxygen through the discharge orifice onto the steel slab.

A plurality of preheat nozzles are mounted adjacent to each other in a row substantially across the width of the upper preheat block. Each nozzle includes a central bore through which a flow of oxygen is received from the manifold and head assembly. The fuel gas is delivered in a substantially parallel, concentric flow around the central flow of oxygen to prevent a steep fuel gas flow intersection with the oxygen adjacent to the nozzles and to maintain the momentum of the oxygen as it exits the central bore. Mixing of oxygen and fuel gas occurs further downstream to produce a hotter flame at a more extended distance from the scarfing units as compared to other more conventional scarfing unit designs.

In the preferred embodiment, the preheat nozzles are nozzle inserts. Each nozzle insert comprises a longitudinally extending, substantially cylindrically configured nozzle member having opposing gas entrance and discharge ends. The central bore extends axially through the nozzle member. Each nozzle member is mounted within a mounting hole of the upper preheat block. An O-ring is positioned on the outer circumference of the nozzle member, and aids in removably securing the nozzle member in the mounting holes. The O-ring also serves as a seal to segregate the oxygen and the fuel gas. Longitudinally extending, substantially parallel flutes are mounted on the outer surface of the nozzle member and form fuel gas flow channels through which fuel gas received from the manifold and head assembly is directed into a substantially, parallel, concentric flow around the central flow of oxygen to prevent the steep fuel gas flow intersection with the oxygen and to maintain the momentum of the oxygen as it exits the central bore.

In the preferred embodiment, the central bore of the nozzle member includes a first converging portion and a second diverging portion terminating in an oxygen discharge end of the nozzle member. The diameter of the diverging portion at the oxygen discharge end is less than the diameter of the bore before converging. This construction provides for a high speed oxygen flow from the central bore.

In the preferred embodiment, the lower preheat block includes a fuel gas flow channel and discharge end positioned adjacent the oxygen slot defined between the upper and lower preheat blocks. The upper preheat block includes a slot positioned above the row of nozzles. The slot extends through the upper preheat block for receiving a flow of oxygen from the manifold and head assembly and forming a shielded oxygen flow for the gas exiting the discharge end of the nozzles.

In accordance with the present invention, the method of initiating end scarfing on the end of a steel slab using the scarfing apparatus of the invention is disclosed. The method comprises the steps of positioning the apparatus a diagonal standoff distance greater that one and half inches from the edge of the steel slab. A flow of preheating fuel gas and oxygen is generated to preheat the end corner of the steel slab. The flow of preheating oxygen and fuel gas is substantially terminated. A high pressure flow of scarfing oxygen is generated, and the steel slab is moved toward the scarfing apparatus at a relatively slow first speed The speed of the slab movement past the scarfing apparatus is then increased to a normal scarfing speed which is three to four times faster than the first speed.

In a preferred method, the diagonal standoff distance is from six to ten inches during preheating of the slab. The horizontal standoff distance from the steel slab is three to five inches during preheating of the slab. The vertical standoff distance from the steel slab is 1.5 to 2.0 inches. The flow of scarfing oxygen is generated about two seconds before the steel slab initially moves toward the scarfing apparatus.

BRIEF DESCRIPTION OF THE DRAWINGS

Some of the objects and advantages of the present invention having been set forth above, other objects and advantages will appear as the description proceeds, when taken in conjunction with the accompanying drawings, in which.

DETAILED DESCRIPTION OF THE PREFERRED EMBODIMENT

Figure 1:
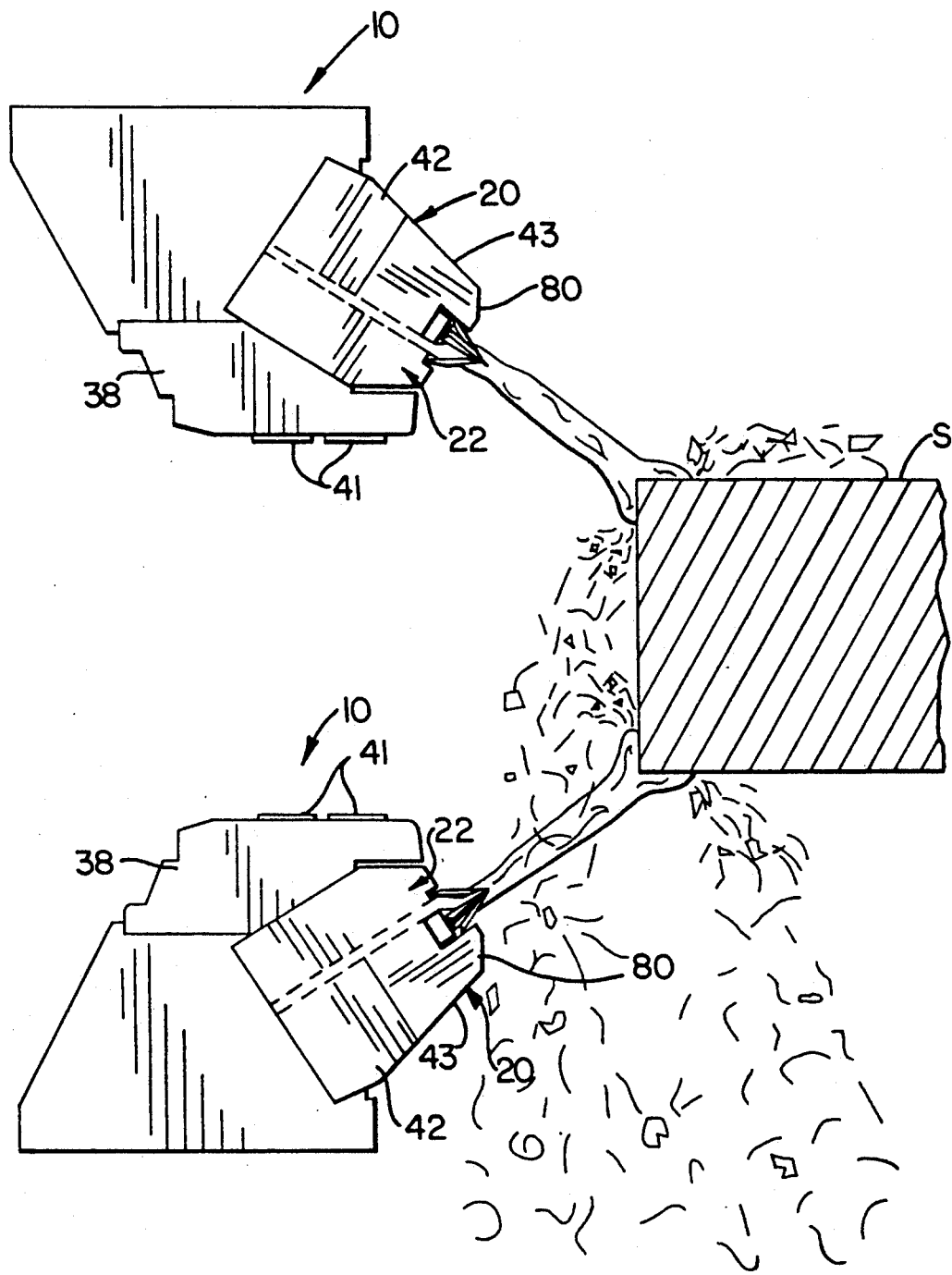
FIG. 1 is a schematic side elevation view of upper and lower scarfing apparatus positioned for preheating and scarfing of a steel slab.

Referring now to the drawings, and more particularly to FIG. 1, there is illustrated the scarfing apparatus 10 in accordance with the present invention. Two scarfing apparatus 10 are illustrated in two positions, one above and one below the plane of a steel slab to be scarfed. The scarfing apparatus 10 are usually mounted a ross the width of supports 11 (FIG. 6) and arranged to scarf the top and bottom of a slab S. Additionally, side scarfing units 10a are positioned on supports 11 to aid in scarfing the sides of a slab S (FIG. 6), which normally is positioned on a movable table (not shown) that can extend through the rectangular housing configuration defined by the scarfing apparatus.

In accordance with the present invention, the scarfing apparatus 10 is constructed to allow a stand-off distance from a slab during preheating and scarfing so that preheating and scarfing can occur on the end corner of the slab without having slag or other hot, molten metal fall onto the apparatus, as occurs in other, conventional scarfing units during initial starting adjacent the slab edge.

Figure 2:
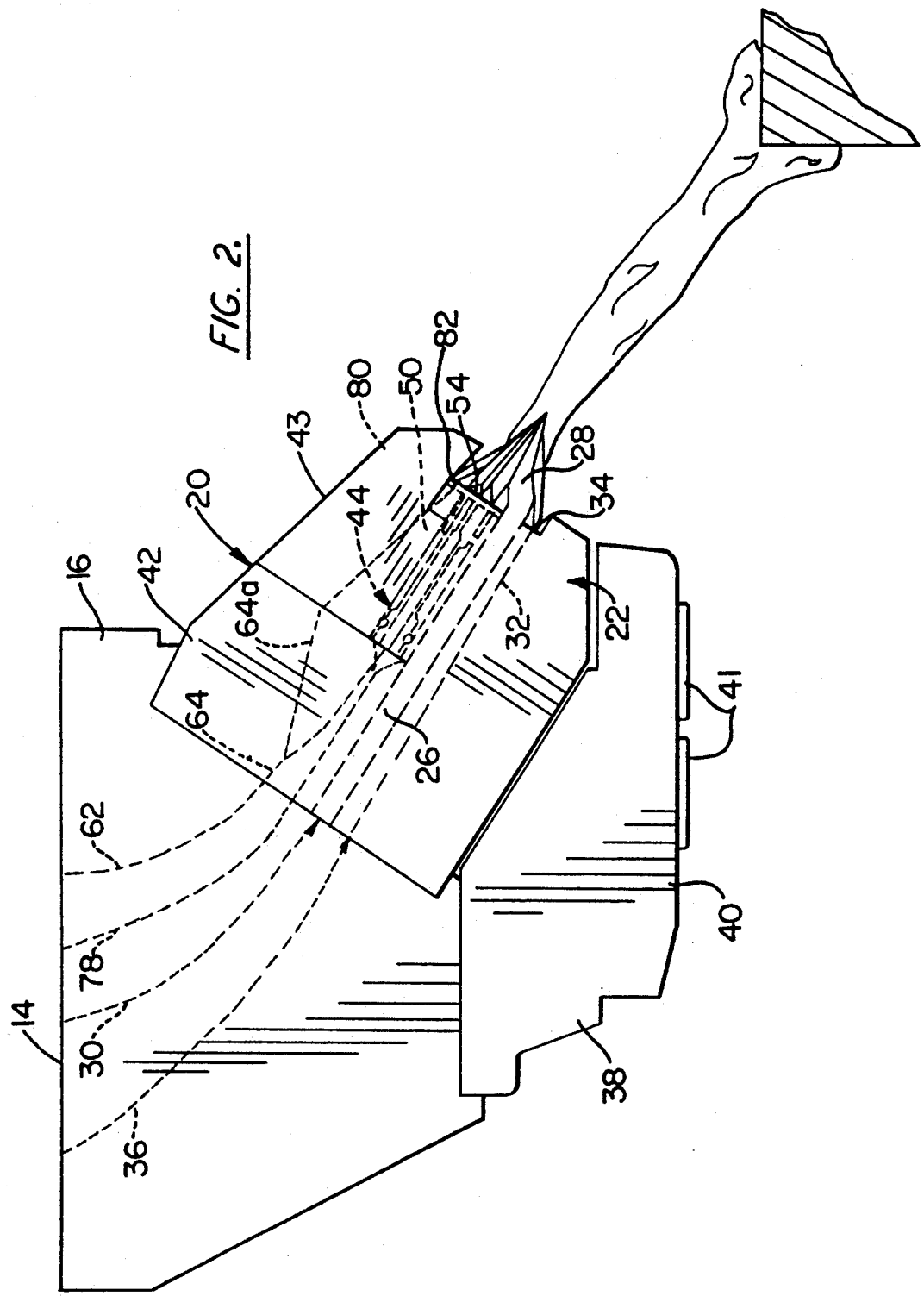
FIG. 2 is an enlarged, schematic side elevation view of the upper scarfing apparatus of FIG. 1.

As shown in greater detail in the schematic manifold and head assembly 14, typically formed from a illustration of FIG. 2, the apparatus includes a bronze material, and having fuel and oxygen gas channels (shown schematically) which receive and distribute oxygen and fuel gas. The manifold and head assembly 14 includes a formed slot 16 along one edge in which upper and lower preheat blocks 20, 22 are mounted. Both the upper and lower preheat blocks 20, 22 extend from the manifold and head assembly 14 a substantially equal distance to each other. The upper and lower preheat blocks are preferably formed from copper.

The upper and lower preheat blocks 20, 22 are spaced from each other to define an oxygen slot 26 and discharge orifice 28 of predetermined size for receiving a flow of scarfing oxygen from the manifold and head assembly and discharging the scarfing oxygen through the discharge orifice onto the steel slab S (FIG. 2). An oxygen flow channel, illustrated schematically at 30, extends through the manifold and head assembly 14 and connects to the entrance end of the oxygen scarfing slot 26.

The lower preheat block 22 includes a fuel gas flow channel, indicated schematically at 32, and a discharge end 34 positioned adjacent to the scarfing slot 26. Fuel gas flows through a fuel gas flow channel 36 of the manifold and head assembly 14 into the fuel gas passageway 32 and exits as a scarfing flame during scarfing. A riding shoe 38 is positioned along the underside of the lower preheat block 22 and the manifold and head assembly 16. The riding shoe 38 includes a lower slab engaging surface 40 having slab engaging skids 41 adapted to contact the slab to position the scarfing discharge orifice 28 as well as the other exiting fuel and oxygen flows a predetermined distance from the steel slab. As shown in FIG. 1, the lower scarfing apparatus 10 is inverted and the riding shoe 38 is positioned to engage the bottom surface of the steel slabs S.

Figure 3:
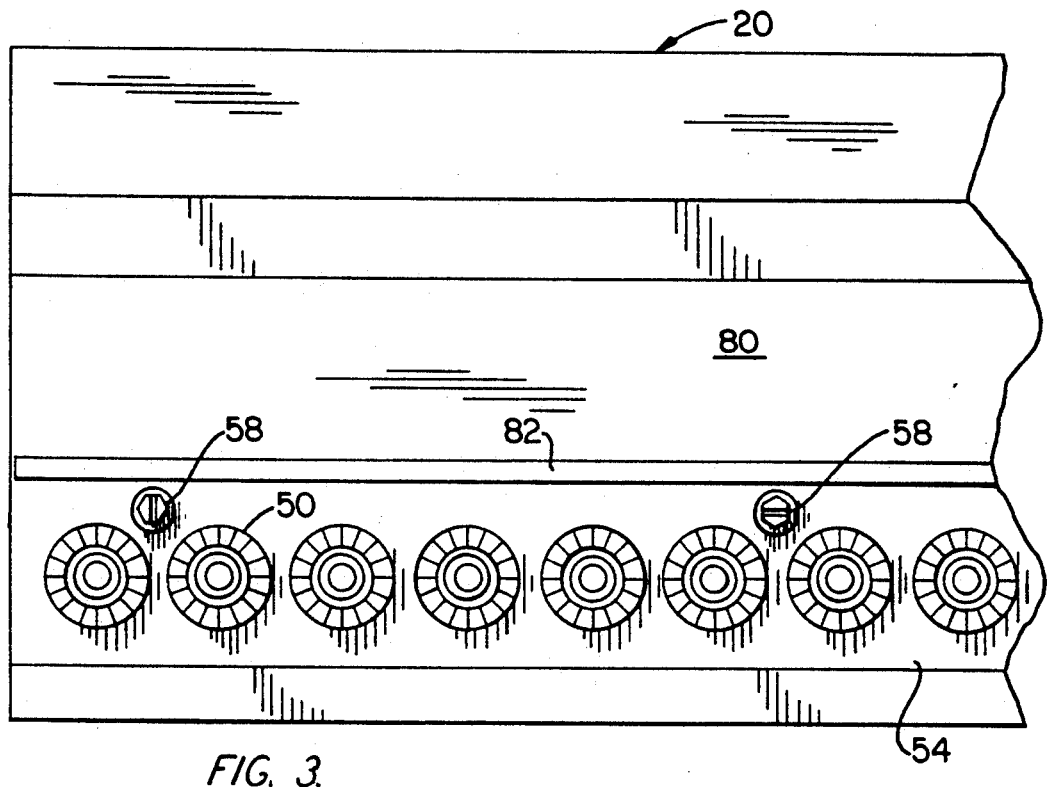
FIG. 3 is a front elevation view of the scarfing apparatus showing a plurality of nozzle inserts mounted in the upper preheat block.
Figure 4:
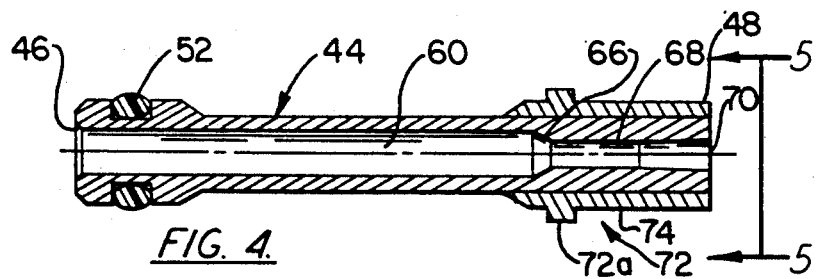
FIG. 4 is a sectional view of a nozzle insert in accordance with a preferred embodiment of the present invention.

Each upper preheat block 20 includes a base member 42, and an extension member 43 secured to the base member 42 and extending forwardly therefrom. A plurality of preheat nozzle inserts 44 (FIGS. 3 and 4) are mounted adjacent to each other in a row across the width of the extension member 43. Each nozzle insert 44 is formed as a longitudinally extending, substantially cylindrically configured nozzle member extending into the extension member 43 and base member 44 (FIG. 2). The nozzle members 44 preferably are formed of brass, and have opposing gas entrance and discharge ends 46, 48 (FIG. 4). Each nozzle member 44 is mounted within a mounting hole 50 in the extension member 43. An O-ring 52 is positioned on the outer circumference of the nozzle member 44 at the entrance end and aids in centering and removably securing the nozzle member 44 within the mounting holes 50 of the upper preheat block 20. Additionally, the O-ring serves as a seal to segregate oxygen and fuel gas.

A mounting plate 54 is secured to the upper preheat block and engages the discharge ends 48 of the nozzle members 44. The mounting plate 54 also aids in retaining the nozzle members 44 within the mounting holes 50. The mounting plate 54 includes holes which align and center the discharge ends 48 of the nozzle members 44. The mounting plate 54 is secured to the upper preheat block 20 by fasteners, such as machine bolts 58 (FIG. 3).

As illustrated in greater detail in FIG. 4, a central bore 60 extends axially through the nozzle member 44. An oxygen flow channel 62 within the manifold and head assembly 14 passes gas into an upper preheat block fuel channel 64 and through the central bore 60 in communication with the channel 64 (FIG. 2). The central bore 60 includes a first converging portion 66, and a second, diverging portion 68 terminating in an oxygen discharge end 70 of the nozzle member 44 (FIG. 4). The converging portion 66 tapers inward at a high angle as shown in FIG. 4. The second, diverging portion 68 tapers outward at a smaller angle. In the preferred embodiment the diameter of the diverging portion 68 at the oxygen discharge end 70 is less than the diameter of the bore before converging. However, the bore before converging could be a smaller diameter than the exit diameter, or the bore could be designed straight completely through. Thus, oxygen gas received into the bore is constricted first within the converging portion where the gas velocity is increased. The oxygen then exits the discharge end 70 as a high-velocity, accurately directed stream against the slab S.

Figure 5:
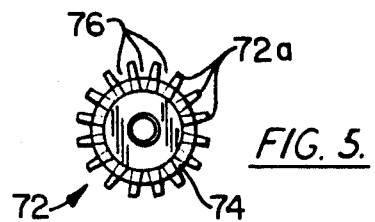
FIG. 5 is an end view of the nozzle insert taken along line 5—5 of FIG. 4.

A retaining ring 72 is mounted on the discharge end 48 of the nozzle member 44. As shown in FIG. 5, the retaining ring 72 includes elongate, concentric ribs 72a which engage the interior surface of the mounting holes 50. The ribs 72a form a plurality of longitudinally extending, substantially parallel flutes 74 forming fuel gas flow channels 76 (FIG. 5) around the nozzle member periphery through which fuel gas flows outward from the nozzle in substantially parallel, concentric flow around the central flow of oxygen. Fuel gas is delivered through an upper preheat block channel 78 (FIG. 2) and then onto the outer surface of the nozzle member 44 and into the fuel gas channels 76 by the flutes. The concentric flow of fuel gas around the central flow of oxygen prevents a fuel gas flow intersection with the oxygen adjacent the nozzles. Thus, the momentum of the oxygen is maintained as it exits the nozzle member 44. Mixing of oxygen and fuel gas occurs further downstream to produce a hotter flame at a more extended distance from the preheat blocks.

A forwardly protruding portion of the extension member 43 forms a shield plate 80 (FIGS. 2 and 3), which is positioned in spaced relation above the insert plate 54 to form a slot 82. An oxygen flow channel 64a extends off from the central oxygen flow channel 64 and through the upper preheat block to the slot 82. Oxygen discharged through the slot 82 forms a shielded oxygen flow for the oxygen and fuel gas flowing from the nozzle member 44.

During operation, the apparatus 10 are positioned as shown in FIG. 1, including the side scarfing units (not shown), and the flows of oxygen and fuel gas through the various passageways are controlled to preheat the slab S. Because the nozzle member 44 provides an efficient oxygen and fuel gas flow outward from the apparatus 10 without a sharp fuel gas flow intersection with the oxygen adjacent the nozzles, the momentum of the oxygen exiting the central bore is maintained until it intersects the fuel gas further downstream from the preheat blocks. As a result, a more enhanced and hotter flame is achieved, and the diagonal stand-off distance is increased as compared to other conventional scarfing apparatus. A diagonal stand-off distance as high as fifteen inches has been achieved. As a result of this greater diagonal stand-off distance, during initial scarfing of the slab S, the slag and molten steel cannot drop onto the apparatus and the scarfing operation can begin at the end portion of the slab. Additionally, during continued use of the apparatus, the discharge end of the nozzle member may become worn. The nozzle member 44 can be readily replaced by removing the mounting plate 54, and then removing the damaged nozzle member 44. A new nozzle member 44 is inserted within the mounting hole 50.

Figure 7:
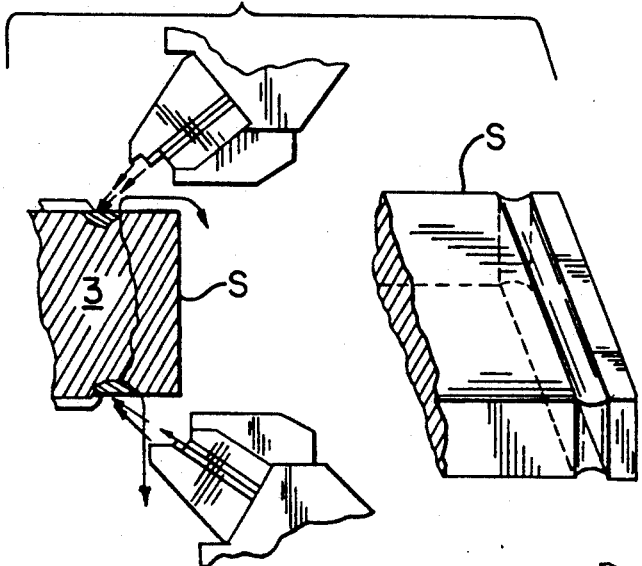
FIG. 7 is a schematic illustration of a prior art method of initiating end scarfing of a steel slab.
Figure 8:
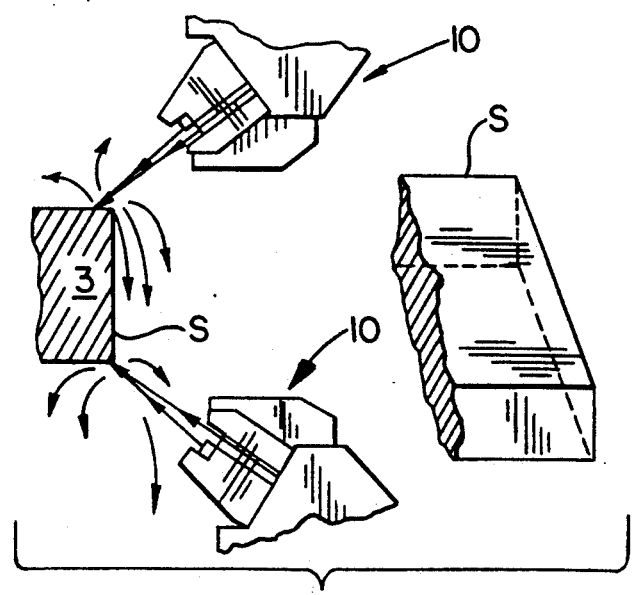
FIG. 8 is a schematic illustration of the method of initiating end scarfing of a steel slab in accordance with present invention.
Figure 9:
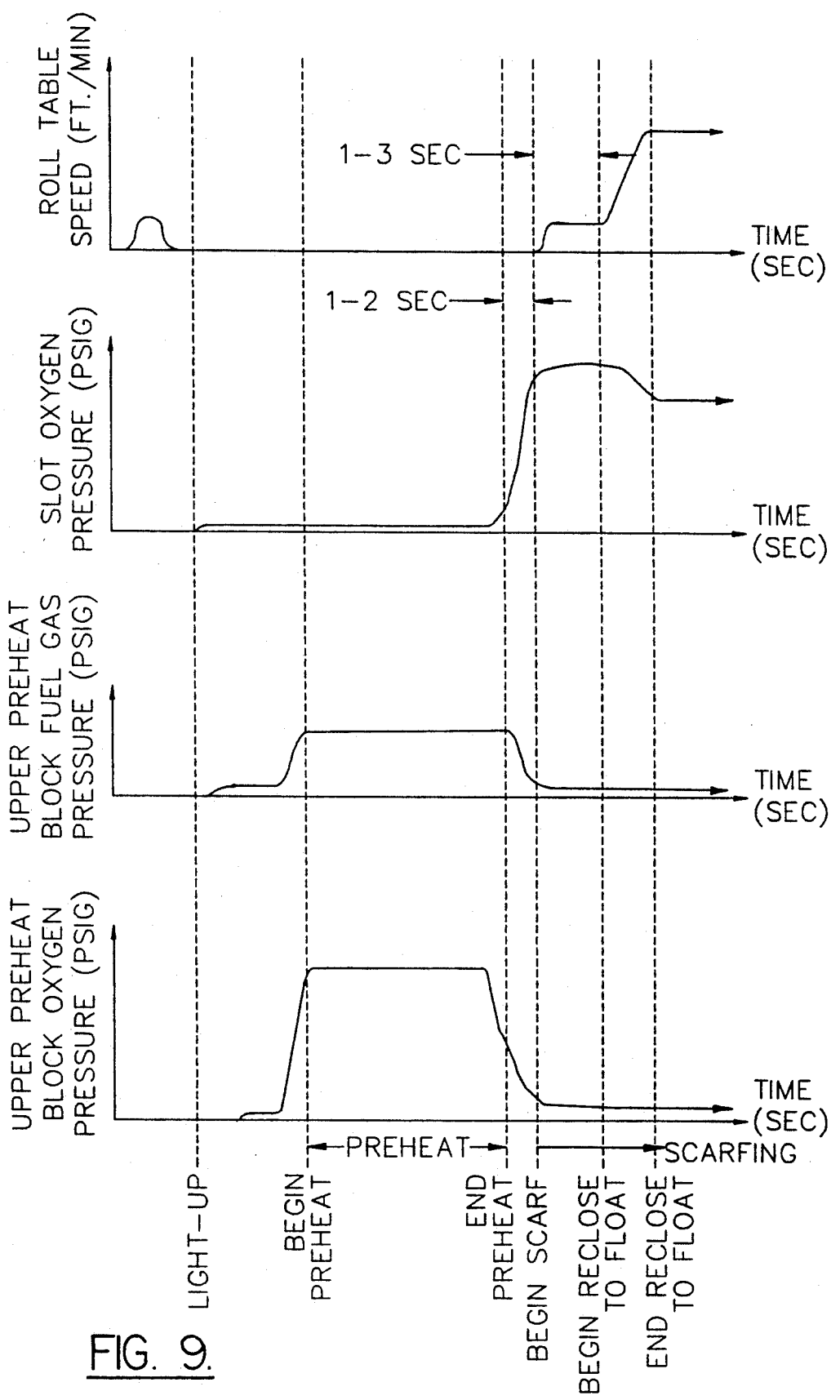
FIG. 9 is a graph of various stages in the preheating and initiation of end scarfing of a steel slab.
Figure 10:
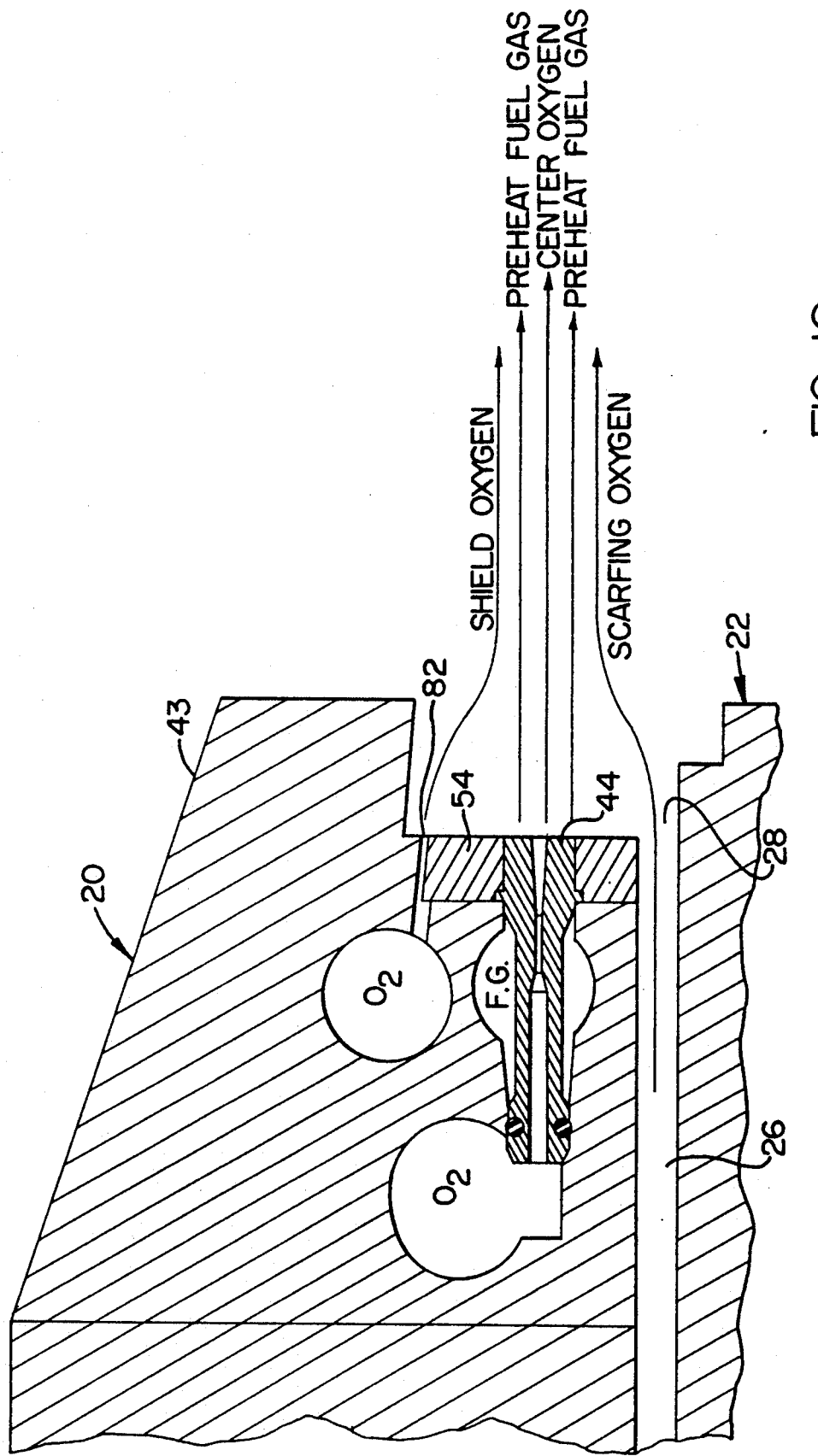
FIG. 10 is a fragmentary sectional view of the upper preheat block nd illustrating the preheating gas streams.

Referring now to FIGS. 8 and 9, the method of initiating end scarfing on the end of a steel slab using the scarfing apparatus of the present invention is shown. In FIG. 7, the prior art method is illustrated and shown with a prior art apparatus having an overhanging preheat block. As shown, the scarfing apparatus begins it preheat one or two inches inward of the edge. In this preheat position, the apparatus has about a 0.5 inch vertical standoff above the slab, creating about a 1.25 inch diagonal standoff distance. As a result of starting the preheat inward from the slab end, a gullet G is formed across the width of the slab edge.

Looking now at FIG. 8, a preferred method of scarfing in accordance with the present invention is illustrated. During initial preheating, the scarfing apparatus is positioned as shown in FIG. 8. As compared to the prior art preheating method in which the diagonal standoff distance is only 1.25 inches (FIG. 7), the diagonal standoff distance of the inches. The horizontal standoff distance is three to five inches, as compared to the other prior art method in which there is not horizontal standoff separation and the prior art apparatus is positioned above the steel slab. The vertical standoff distance is approximately 1.5 to 2.0 inches as compared to the prior art method in which the vertical standoff preheating distance is only 0.5 inches.

Figure 6:
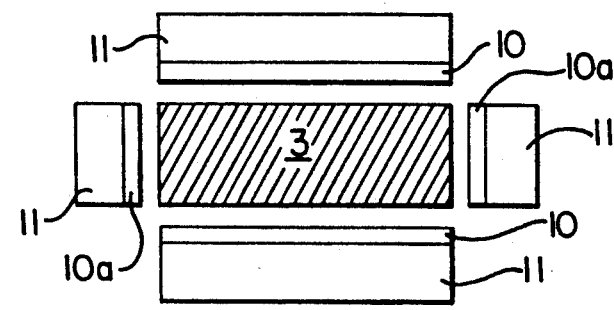
FIG. 6 is a schematic end view of scarfing apparatus positioned around a steel slab to be scarfed.

To initiate preheating, the table (not shown) on which the steel slab rests is moved into a position in which the scarfing apparatus 10 are positioned over and adjacent the slab. The scarfing units are closed as in conventional scarfing operations, and then the table is retracted into the preheat position (FIGS. 6 and 8). The scarfing apparatus preheat fuel gas is ignited, and then the preheat fuel gas flow rate is increased. Just after the preheat flow rate is increased, the oxygen preheat flow is generated, and that flow rate is increased to about twice as much as normal oxygen preheat flow rates for the prior art methods and scarfing apparatus. Although the scarfing method uses an oxygen flow rate twice that of the prior art methods, the preheat fuel gas pressure actually is lower because the nozzles form a larger exit area than the prior art scarfing apparatus.

Once the steel slab is preheated, the oxygen flow is substantially reduced as shown in FIG. 9, and the flow of scarfing oxygen is generated. When the scarfing oxygen has reached its peak pressure and flow rate, the preheating fuel gas is reduced, and the table holding the steel slab is moved toward the scarring apparatus. In the preferred embodiment, the "dead time" in which the scarfing oxygen remains until table movement is about two seconds.

The table is initially moved forward at a first speed, which is about one-fourth at the normal speed of scarfing. As the table moves forward, its speed is increased to the normal scarfing speed, four times as fast as the first speed. The flow rate of the oxygen is decreased slightly at the time when the table speed reaches the normal scarfing speed. Scarfing continues as in normal prior art apparatus.

IN the drawings and specification, there has been set of the preferred embodiment of this invention, and even through specific terms are used, they are used in a generic and descriptive sense only and not for purposes of limitation.

That which is claimed is:

1. An apparatus for thermometrically scarfing a metal workpiece comprising
   a manifold and heat assembly which includes upper and lower preheat blocks, with said blocks being spaced from each other to define an oxygen scarfing slot therebetween, and a plurality of discharge nozzles mounted in said upper block adjacent to each other in a row above and parallel to said slot, with each nozzle including a central bore for receiving an oxidizing gas form said manifold and heat assembly and discharging the same as a high speed central stream, and outer channel means for receiving a fuel gas form said manifold and head assembly and discharging the same in a substantially concentric stream disposed coaxially about and parallel to said central stream of oxidizing gas, and
   whereby the discharge nozzles may be utilized to preheat the metal workpiece, and wherein the concentric stream of fuel gas of each discharge nozzle does not appreciably interfere with the momentum of the central stream of oxidizing gas of the associated nozzle, and the apparatus may thus be located a significant stand-off distance from the metal workpiece.

2. The apparatus as defined in claim 1 wherein said upper preheat block includes a slot positioned above and parallel to said row of discharge nozzles for receiving a flow of oxygen from said manifold and hat assembly and forming a shielding oxygen flow of the stream exiting said discharge nozzles.

3. The apparatus as defined in claim 2 wherein said lower preheat block includes a fuel gas flow channel and discharge outlet positioned below said oxygen scarfing slot.

4. The apparatus as defined in claim 1 wherein each of said nozzles comprises a mounting opening in said upper block, and a generally cylindrical nozzle insert mounted in said mounting opening, with said nozzle insert including said central bore and having a plurality of longitudinally extending substantially parallel flutes spaced about the exterior surface thereof, and such that the flutes and the mounting opening define said outer channel means therebetween.

5. The apparatus as defined in claim 4 wherein said flutes extend along a portion of the length of the associated nozzle insert adjacent the discharge end thereof, and wherein each of said nozzle inserts further includes a resilient O-ring positioned circumferentially thereabout at a location adjacent the opposite end thereof and so as to form a seal with the mounting opening of said upper block.

6. The apparatus as defined in claim 4 wherein the central bore of each nozzle insert includes a first converging portion and a second diverging portion terminating at the discharge end of the nozzle insert.

7. The apparatus as defined in claim 6 wherein the diameter of the central bore before converging has a diameter smaller than the discharge end of the nozzle insert.

8. The apparatus as defined in claim 6 wherein the diameter of the diverging portion of the central bore at the discharge end is less than the diameter of the bore before converging.

9. The apparatus as defined in claim 1 further including a riding shoe positioned along the underside of the lower preheat block which is adapted for contacting the metal workpiece and positioning the upper and lower preheat blocks a predetermined distance from the metal workpiece during scarfing.

* * * * *

UNITED STATES PATENT AND TRADEMARK OFFICE
CERTIFICATE OF CORRECTION

PATENT NO. : 5,234,658
DATED : August 10, 1993
INVENTOR(S) : Showalter et al.

It is certified that error appears in the above-identified patent and that said Letters Patent is hereby corrected as shown below:

Column 4, line 11, "nd" should be -- and --.

Column 4, line 21, "a ross" should be -- across --.

Column 4, line 36, after "schematic" insert -- illustration of FIG. 2, the apparatus includes a -- .

Column 4, lines 37-38, omit "a illustration of FIG. 2, the apparatus includes".

Column 4, line 44, "Outward" should be -- outward --.

Column 6, line 61, after "the" insert -- present invention is greater, ranging from six to ten --.

Column 6, line 63, "not" should be -- no --.

Column 7, line 23, "scarring" should be -- scarfing --.

Column 7, line 28, after "one-fourth" omit "at".

Column 7, line 35, "IN" should be -- In --.

Column 7, line 35, after "set" insert -- forth a --.

Column 7, line 36, omit "of the".

Column 7, line 37, "through" should be -- though --.

Column 7, line 42, "thermometrically" should be -- thermochemically --.

UNITED STATES PATENT AND TRADEMARK OFFICE
CERTIFICATE OF CORRECTION

PATENT NO. : 5,234,658
DATED : August 10, 1993
INVENTOR(S) : Showalter et al.

It is certified that error appears in the above-indentified patent and that said Letters Patent is hereby corrected as shown below:

Column 7, line 44, "heat" should be -- head --.

Column 7, line 51, "form" should be -- from --.

Column 7, line 52, "heat" should be -- head --.

Column 7, line 54, "form" should be -- from --.

Column 8, line 14, "hat" should be -- head --.

Column 8, line 15, "of" should be -- for --.

Signed and Sealed this

Twenty-ninth Day of March, 1994

Attest:

BRUCE LEHMAN

Attesting Officer

Commissioner of Patents and Trademarks